United States Patent
Cao et al.

(10) Patent No.: US 11,775,581 B1
(45) Date of Patent: Oct. 3, 2023

(54) SYSTEMS AND METHODS FOR FEATURE-BASED MUSIC SELECTION

(71) Applicant: Meta Platforms, Inc., Menlo Park, CA (US)

(72) Inventors: Bokai Cao, Fremont, CA (US); Parth Popatlal Detroja, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 720 days.

(21) Appl. No.: 16/574,379

(22) Filed: Sep. 18, 2019

(51) Int. Cl.
*G06F 16/683* (2019.01)
*G06N 3/04* (2023.01)
*G06F 16/638* (2019.01)
*G06F 40/30* (2020.01)

(52) U.S. Cl.
CPC .......... *G06F 16/685* (2019.01); *G06F 16/639* (2019.01); *G06F 40/30* (2020.01); *G06N 3/04* (2013.01); *G10H 2210/076* (2013.01); *G10H 2210/081* (2013.01)

(58) Field of Classification Search
None
See application file for complete search history.

(56) References Cited

U.S. PATENT DOCUMENTS

| | | |
|---|---|---|
| D392,267 S | 3/1998 | Mason et al. |
| D472,902 S | 4/2003 | Nashida et al. |
| D559,258 S | 1/2008 | Kita et al. |
| D588,151 S | 3/2009 | Okada |
| D606,080 S | 12/2009 | Marchie et al. |
| D616,463 S | 5/2010 | Barcheck et al. |
| D658,203 S | 4/2012 | Hally et al. |
| 8,572,169 B2 | 10/2013 | Partovi et al. |
| D696,269 S | 12/2013 | Hyunjung et al. |
| D713,851 S | 9/2014 | Wood |
| D715,314 S | 10/2014 | Wood |
| D716,822 S | 11/2014 | Wood |
| D723,044 S | 2/2015 | Park |
| 8,971,623 B2 | 3/2015 | Gatt et al. |
| D738,889 S | 9/2015 | Bailes et al. |
| 9,171,095 B1 | 10/2015 | Bilinski et al. |

(Continued)

OTHER PUBLICATIONS

Preinterview First Office Action received for U.S. Appl. No. 16/595,267 dated Jul. 1, 2020, 35 pages.

(Continued)

*Primary Examiner* — Thu N Nguyen
(74) *Attorney, Agent, or Firm* — Greenberg Traurig, LLP (57) ABSTRACT

Systems and methods for feature-based music selection may include (1) receiving user input selecting a music composition, (2) identifying features of the music composition including (i) a musical feature, relating to a musical quality of the music composition and (ii) a lyrical feature, relating to one or more of the music composition's lyrics, (3) determining that an additional music composition is similar to the music composition based on a comparison of the features of the music composition with features of the additional music composition, and (4) selecting the additional music composition to be added to a queue associated with the music composition based on the determination. Various other methods, systems, and computer-readable media are also disclosed.

20 Claims, 5 Drawing Sheets

(56) References Cited

U.S. PATENT DOCUMENTS

| | | | |
|---|---|---|---|
| D759,680 S | 6/2016 | Behar | |
| D760,267 S | 6/2016 | Butcher et al. | |
| D760,759 S | 7/2016 | Butcher et al. | |
| D761,268 S | 7/2016 | Oh et al. | |
| D763,904 S | 8/2016 | Knapp et al. | |
| D767,622 S | 9/2016 | Lee et al. | |
| D770,495 S | 11/2016 | Knapp | |
| D770,499 S | 11/2016 | Rodriguez | |
| D770,500 S | 11/2016 | Rodriguez | |
| D773,526 S | 12/2016 | Butcher et al. | |
| D773,527 S | 12/2016 | Butcher et al. | |
| D773,534 S | 12/2016 | Yuk et al. | |
| D774,053 S | 12/2016 | Kim et al. | |
| D792,445 S | 7/2017 | Sun | |
| D792,453 S | 7/2017 | Butcher et al. | |
| D794,663 S | 8/2017 | Sakuma | |
| D803,239 S | 11/2017 | Yuk et al. | |
| D814,515 S | 4/2018 | Guzman et al. | |
| D819,683 S | 6/2018 | Zhang et al. | |
| D829,759 S | 10/2018 | Clapper et al. | |
| D831,062 S | 10/2018 | Chen | |
| D831,066 S | 10/2018 | Takita et al. | |
| 10,175,757 B2 | 1/2019 | Missig et al. | |
| 10,270,983 B1 | 4/2019 | Van Os et al. | |
| D851,111 S | 6/2019 | Dye et al. | |
| D852,210 S | 6/2019 | Wei | |
| D853,410 S | 7/2019 | Barnett et al. | |
| 10,490,026 B2 | 11/2019 | Bryant et al. | |
| D868,811 S | 12/2019 | Jeon et al. | |
| 10,496,705 B1 | 12/2019 | Irani et al. | |
| D874,497 S | 2/2020 | Krenkler et al. | |
| D874,498 S | 2/2020 | Krenkler et al. | |
| D874,499 S | 2/2020 | Krenkler et al. | |
| D874,500 S | 2/2020 | Krenkler et al. | |
| D877,193 S | 3/2020 | Li et al. | |
| 10,623,621 B2 | 4/2020 | Li et al. | |
| D889,478 S | 7/2020 | Rotgans et al. | |
| D890,188 S | 7/2020 | Anno et al. | |
| D892,855 S | 8/2020 | Liu | |
| D895,649 S | 9/2020 | Jetly et al. | |
| 10,783,320 B2 | 9/2020 | Jon et al. | |
| 10,803,160 B2 | 10/2020 | Tussy | |
| D900,845 S | 11/2020 | Tomori | |
| D902,242 S | 11/2020 | Assaf et al. | |
| 10,911,504 B1 | 2/2021 | Paul | |
| 2005/0038819 A1 | 2/2005 | Hicken et al. | |
| 2008/0072740 A1* | 3/2008 | Horii | G11B 27/105 |
| 2008/0122796 A1 | 5/2008 | Jobs et al. | |
| 2009/0182736 A1 | 7/2009 | Ghatak | |
| 2009/0260507 A1* | 10/2009 | Gannon | G10H 1/0025 |
| | | | 84/613 |
| 2009/0262087 A1 | 10/2009 | Kim | |
| 2009/0319356 A1 | 12/2009 | Spitzer et al. | |
| 2010/0049702 A1 | 2/2010 | Martinez et al. | |
| 2010/0192105 A1 | 7/2010 | Kim et al. | |
| 2011/0125712 A1* | 5/2011 | Kaila | G06F 16/44 |
| | | | 707/626 |
| 2011/0267530 A1 | 11/2011 | Chun | |
| 2012/0054666 A1 | 3/2012 | Baird-Smith et al. | |
| 2012/0118127 A1* | 5/2012 | Miyajima | G10H 1/38 |
| | | | 84/612 |
| 2012/0303711 A1 | 11/2012 | Park | |
| 2012/0323938 A1 | 12/2012 | Skeen et al. | |
| 2013/0073280 A1* | 3/2013 | O'Neil | G06F 40/20 |
| | | | 704/E11.001 |
| 2013/0073983 A1 | 3/2013 | Rasmussen et al. | |
| 2013/0182138 A1 | 7/2013 | Cho | |
| 2013/0198268 A1 | 8/2013 | Hyman | |
| 2013/0218721 A1 | 8/2013 | Borhan et al. | |
| 2014/0031961 A1 | 1/2014 | Wansley et al. | |
| 2015/0003814 A1* | 1/2015 | Miller | H04N 21/4334 |
| | | | 386/297 |
| 2015/0127748 A1 | 5/2015 | Buryak | |
| 2015/0148106 A1 | 5/2015 | Choi et al. | |
| 2015/0186454 A1 | 7/2015 | Kim | |
| 2015/0264169 A1 | 9/2015 | Yim et al. | |
| 2016/0034970 A1 | 2/2016 | Musil et al. | |
| 2016/0205340 A1 | 7/2016 | Jang et al. | |
| 2016/0226804 A1 | 8/2016 | Hampson et al. | |
| 2016/0292269 A1 | 10/2016 | O'Driscoll et al. | |
| 2017/0068910 A1 | 3/2017 | Burroughs | |
| 2017/0109642 A1 | 4/2017 | Kawale et al. | |
| 2018/0189391 A1 | 7/2018 | Ip et al. | |
| 2018/0190249 A1* | 7/2018 | Roblek | G06N 3/084 |
| 2018/0224990 A1 | 8/2018 | Shim et al. | |
| 2019/0050128 A1 | 2/2019 | Lee | |
| 2019/0080066 A1 | 3/2019 | Van Os et al. | |
| 2019/0215449 A1 | 7/2019 | Chun et al. | |
| 2019/0238646 A1 | 8/2019 | Edwards et al. | |
| 2020/0004495 A1 | 1/2020 | Dundar et al. | |
| 2020/0042554 A1 | 2/2020 | Liu et al. | |
| 2020/0089724 A1 | 3/2020 | Zimovnov et al. | |
| 2020/0117340 A1 | 4/2020 | Amitay et al. | |
| 2020/0241746 A1 | 7/2020 | Chen et al. | |
| 2020/0267267 A1 | 8/2020 | Kim et al. | |
| 2020/0289026 A1* | 9/2020 | Bardy | A61B 5/6824 |
| 2021/0089574 A1* | 3/2021 | Paul | G06F 16/683 |

OTHER PUBLICATIONS

First Action Interview received for U.S. Appl. No. 16/595,267 dated Sep. 2, 2020, 36 pages.

Preinterview First Office Action received for U.S. Appl. No. 16/574,376 dated Sep. 4, 2020, 22 pages.

Zhang et al., "Siamese Style Convolution Neural Networks for Sound Search by Vocal Imitation", IEEE/ACM Transactions on Audio, Speech, and Language Processing, vol. 27, No. 2, Sep. 3, 2018, pp. 1-13.

Preinterview First Office Action received for U.S. Appl. No. 16/555,676 dated May 5, 2021, 49 pages.

Non-Final Office Action received for U.S. Appl. No. 29/706,940 dated Jan. 25, 2021, 23 pages.

"QR code scanning icon stock illustration", URL: https://www.istockphoto.com/vector/qr-code-scanning-icon-gm1158288755-316352859, istockphoto.com, Jun. 26, 2019, pp. 1-3.

Non-Final Office Action received for U.S. Appl. No. 29/706,941 dated Jan. 25, 2021, 23 pages.

Hardwick, Tim, "How to Sign Up for Apple Music", URL: https://www.macrumors.com/how-to/sign-up-for-apple-music/, macrumors.com, Feb. 13, 2019, pp. 1-4.

Spotify, "Daily Mix", URL: https://support.spolify.com/us/using_spotify/discover_music/daily-mix/, as accessed Oct. 21, 2019, pp. 1-3.

Non-Final Office Action received for U.S. Appl. No. 16/555,690 dated Jul. 9, 2020, 20 pages.

Notice of Allowance received for U.S. Appl. No. 16/555,690 dated Oct. 5, 2020, 20 pages.

Paul, Debashish, "Transient Contextual Music Streaming", U.S. Appl. No. 16/555,676, filed Aug. 29, 2019, 54 pages.

Paul, Debashish, "System and Methods for Digitally Fetching Music Content", U.S. Appl. No. 16/581,812, filed Sep. 25, 2019, 44 pages.

Paul, Debashish, "System and Methods for Digitally Proximity-Based Music Stations", U.S. Appl. No. 16/657,008, filed Oct. 18, 2019, 55 pages.

First Action Interview received for U.S. Appl. No. 16/555,676 dated Jun. 24, 2021, 32 pages.

Final Office Action received for U.S. Appl. No. 16/574,376 dated Jul. 15, 2021, 43 pages.

First Action Interview received for U.S. Appl. No. 16/574,376 dated Feb. 4, 2021, 27 pages.

Final Office Action received for U.S. Appl. No. 16/595,267 dated Feb. 24, 2021, 54 pages.

* cited by examiner

SYSTEMS AND METHODS FOR FEATURE-BASED MUSIC SELECTION

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Digital music services provide users with a vast database of music to consume. The vastness of choice enabled by the digital nature of such music services may leave many of their users feeling daunted or inconvenienced by the prospect of manually selecting music to consume. Responding to this, the present disclosure identifies a need for improved systems and methods for selecting music for users of a digital music service based on minimal user input.

The present disclosure is generally directed to a music-retrieval system that selects one or more music compositions for a user based on an initial user input (i.e., input selecting an initial music composition). In some examples, the music-retrieval system may create a music station based on the initial user input and may add the selected music compositions to the music station's queue of music. In one such example, the music-retrieval system may operate as part of a group-music selection system and the music station may represent a shared music station configured for a group of users.

The music-retrieval system may select the music compositions based on a variety of the initial music composition's features. In some examples, the music-retrieval system may identify (1) one or more musical features of the initial music composition (e.g., a beat, a key, and/or a tempo of the music composition) and (2) one or more lyrical features of the initial music composition (e.g., words and/or phrases in the music composition's lyrics). Then, the music-retrieval system may identify music compositions with musical and lyrical features that are similar to the musical and lyrical features of the initial music composition.

While traditional music services may arguably select music compositions based on an initial user input selecting an initial music composition, traditional music services (1) identify a co-presence of other music compositions with the initial music composition in the music stations of users and (2) select the other music compositions based on the co-presence (i.e., deducing that the other music compositions are similar to the initial music composition based on the co-presence). In contrast, the music-retrieval system disclosed herein may select music compositions based on data from an initial music composition itself.

In one embodiment, a disclosed music system may (e.g., in addition to providing music selections for users), enable users of a music-retrieval system to upload and share music with others. In this embodiment, the music-retrieval system may compare the musical and lyrical features of uploaded music to identify and eliminate duplicate uploads.

As will be explained in greater detail below, embodiments of the present disclosure may improve systems for music content selection, allowing computer-based selection models to automatically select music based on an initial music input. The present disclosure may improve the functioning of a computer itself by improving data selection performed by computers. This may also improve the field of heuristic-based music selection, by improving a classifier trained to identify music predicted to be of interest to a user.

Figure 1:
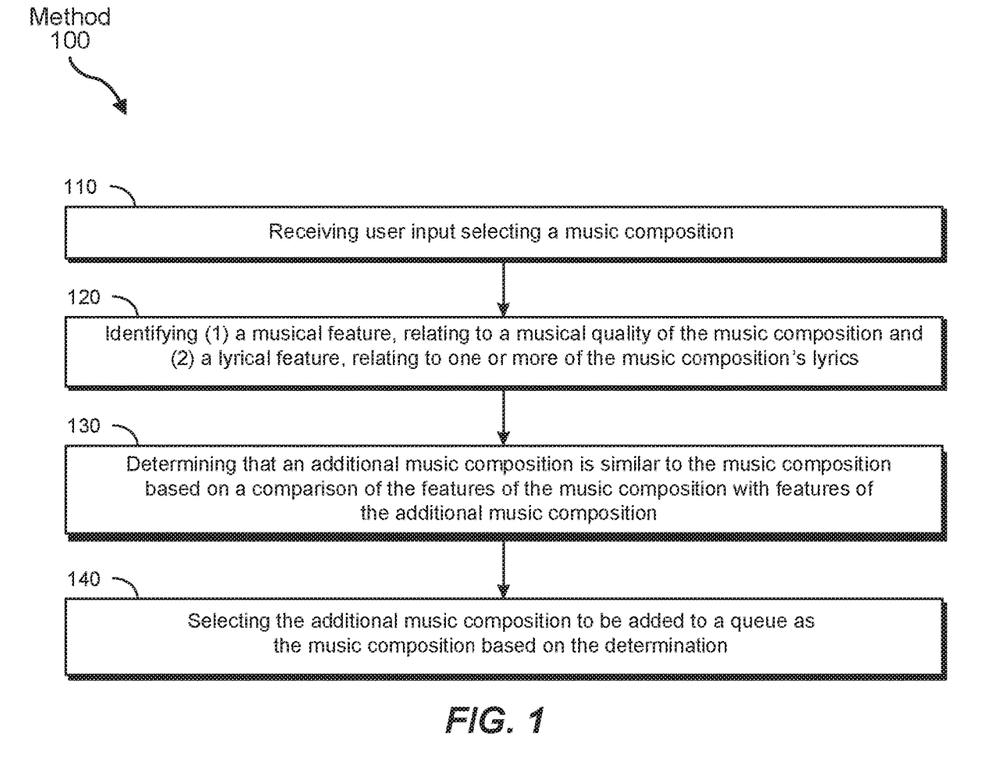
FIG. 1 is a flow diagram of an exemplary method for feature-based music selection.

The following will provide, with reference to FIG. 1, detailed descriptions of computer-implemented methods for feature-based music selection. Detailed descriptions of corresponding example systems will also be provided in connection with FIG. 2. Additionally, detailed descriptions of corresponding exemplary interfaces will be provided in connection with FIGS. 3-5.

FIG. 1 is a flow diagram of an exemplary computer-implemented method 100 for feature-based music selection. The steps shown in FIG. 1 may be performed by any suitable computer-executable code and/or computing system, such as the systems described herein. In one embodiment, the steps shown in FIG. 1 may be performed by modules operating within a computing device. For example, the steps shown in FIG. 1 may be performed by modules operating in a server 202 and/or modules operating in a user device 204 (e.g., as shown in exemplary system 200 in FIG. 2).

Server 202 generally represents any type or form of backend computing device that may perform one or more functions directed at providing music to users of a music service. In some examples, server 202 may perform music functions in conjunction with a social media platform 206 that provides a music service to its users. Although illustrated as a single entity in FIG. 2, server 202 may include and/or represent a group of multiple servers that operate in conjunction with one another.

Figure 2:
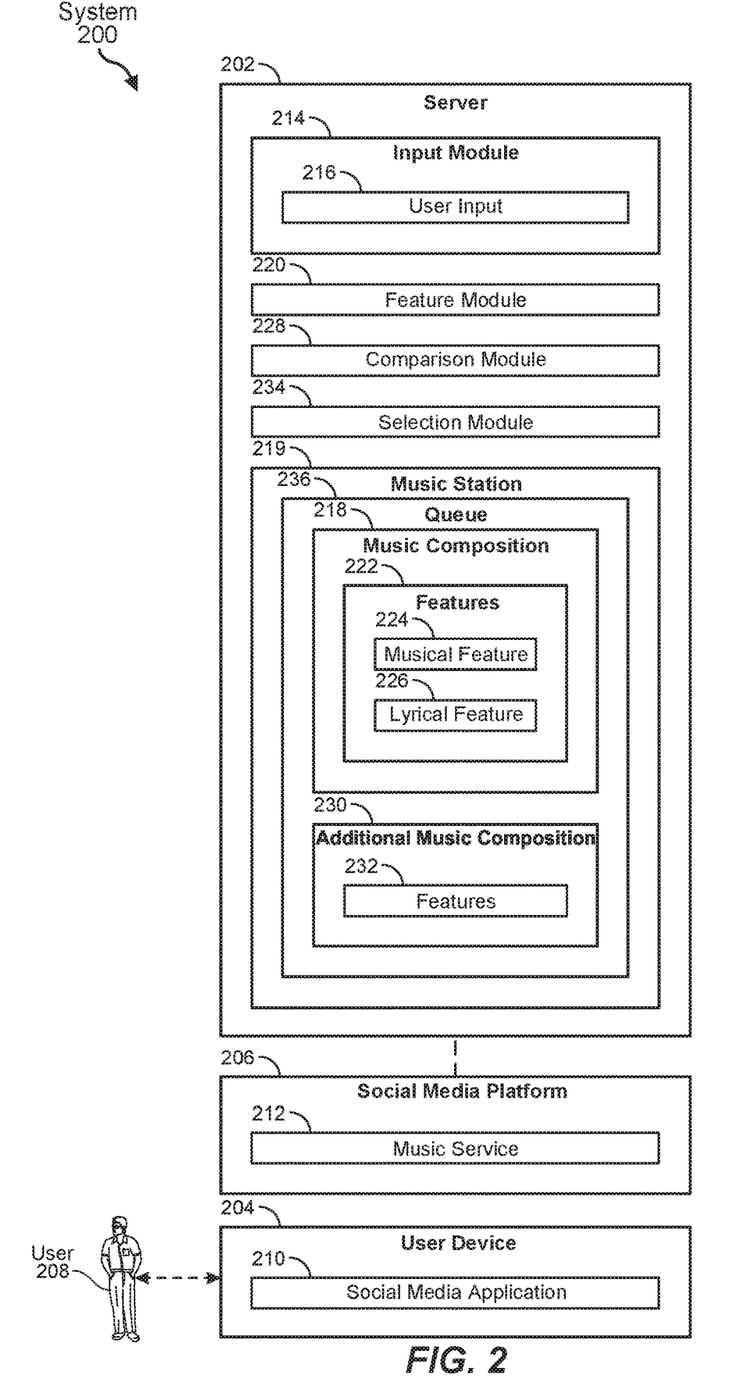
FIG. 2 is a block diagram of an exemplary system for feature-based music selection.

User device 204 generally represents any type or form of computing device capable of reading computer-executable instructions. For example, user device 204 may represent a smart phone and/or a tablet. Additional examples of user device 204 may include, without limitation, a laptop, a desktop, a wearable device, a personal digital assistant (PDA), etc.

In some examples, a user 208 of user device 204 may be a user of a music service operating in conjunction with server 202. In some such examples, the music service may be provided by social media platform 206. In these examples, user 208 may be a member of social media platform 206 and user device 204 may have installed an instance of a social media application 210 that operates as part of social media platform 206. Additionally or alternatively, user device 204 may have installed a browser that may navigate to one or more webpages maintained by social media platform 206.

Social media platform 206 may maintain a variety of data for user 208. For example, social media platform 206 may maintain a profile, which may include a variety of information (e.g., a current city, a workplace, a school, a hometown, etc.). Additionally, social media platform 206 may maintain a database of user 208's contacts within social media platform 206. In some examples, social media platform 206 may maintain a usage history for user 208. For example, social media platform 206 may maintain an archive of content posted and/or consumed by user 208 (e.g., social media compositions, digital photographs, music, messages, etc.) and/or comments and/or digital responses made to content posted by other users.

Social media platform 206 may provide a variety of services for the users within its network (e.g., user 208). In one example, social media platform 206 may provide a newsfeed service. The term "newsfeed" may generally refer to any type or form of social media consumption channel that presents a scrollable collection of newsfeed compositions. In some examples, a newsfeed may scroll (e.g., upward or downward) to reveal different compositions within the newsfeed, in response to receiving user scrolling input. In one example, the scrollable collection may include a collection of newsfeed compositions created by contacts of a particular user (e.g., friends of the particular user). The term "newsfeed composition" as used herein generally refers to any type or form of composition that may be displayed in a newsfeed. Newsfeed compositions may include, without limitation, text-based compositions, media-based compositions (which may include either a single media item or a collage of multiple media items), and/or a link to an online article.

As another example, social media platform 206 may provide a digital story service. The digital story service may provide users with a story consumption channel, which presents a continuous series of digital story compositions to a story-consumer, one by one. In one example, the story consumption channel may transition from presenting one digital story composition to the next automatically, without requiring any user input to do so. In some examples, a digital story composition may only be viewable fora predetermined amount of time. For example, a digital story composition may be set to disappear after twenty-four hours. The term "digital story composition" may generally refer to any type or form of social media composition intended for a story consumption channel. A digital story composition may include a variety of content (e.g., a digital photograph, a graphic, text, a digital video and/or a digital recording of a music composition). In some examples, digital story compositions from a same source (e.g., created and/or posted by a same user) may be grouped together within the story consumption channel, such that each digital story composition from a particular source is displayed prior to displaying digital story compositions from another source.

As another example, social media platform 206 may provide a messaging service. The term "messaging service" may generally refer to any type or form of digital message delivery system that enables users of social media platform 206 to exchange messages (e.g., private messages between two or more users). These messages may include a variety of content (e.g., a text, link, live video, voice recordings, etc.) and may take a variety of forms (e.g., e-mail, text message, group chat, etc.).

In some examples, social media platform 206 may provide a music service 212 that enables users such as user 208 to consume and/or share music via social media platform 206. Music service 212 may provide music for its users in a variety of ways. In one example, music service 212 may provide music in response to a direct user request. For example, music service 212 may receive a user request for a particular music composition and may provide the requested music composition in response to receiving the request (e.g., by playing the requested music composition). In another example, music service 212 may create and/or maintain one or more music stations for user 208.

The term "music station" may refer to any type or form of digital container that stores a queue of music compositions that may be played via a digital music player provided by a music service (e.g., music service 212). In some examples, the queue of music may represent an evolving (e.g., ephemeral) queue. In these examples, music compositions may continually be added to the queue in real time (e.g., as the music compositions within the queue are being played by the digital music player). In other examples, the queue may represent a designated (e.g., static) set of music compositions (e.g., a playlist).

Music service 212 may determine which music compositions to include in a music station in a variety of ways. In some examples, music service 212 may select music compositions for a music station based on an initial user input (e.g., a single input). For example, music service 212 may select music compositions based on an initial user input selecting a starter music composition representative of a type of music composition a user is interested in listening to, as will be discussed in greater detail below in connection with steps 110-140.

Music service 212 may operate within social media platform 206 in a variety of ways. In one embodiment, music service 212 may operate as a passive layer that operates in the background of another service provided by social media platform 206 and/or as a supplemental feature of another service provided by social media platform 206.

For example, music service 212 may operate as a passive layer within a digital story service and/or a newsfeed service. As a specific example, a composition interface that enables user 208 to create a digital story and/or a newsfeed composition may include a selectable element that enables user 208 to add music to the digital story and/or newsfeed composition.

In another example, music service 212 may operate as a passive layer within a messaging service. As a specific example, a messaging interface that enables user 208 to create and participate in a group chat may include a selectable element that enables user 208 to share music via the group chat and/or to co-listen to music with other members of the group chat. The term "group chat" may refer to any type or form of digital message (e.g., an ongoing digital message) between multiple users.

Figure 3:
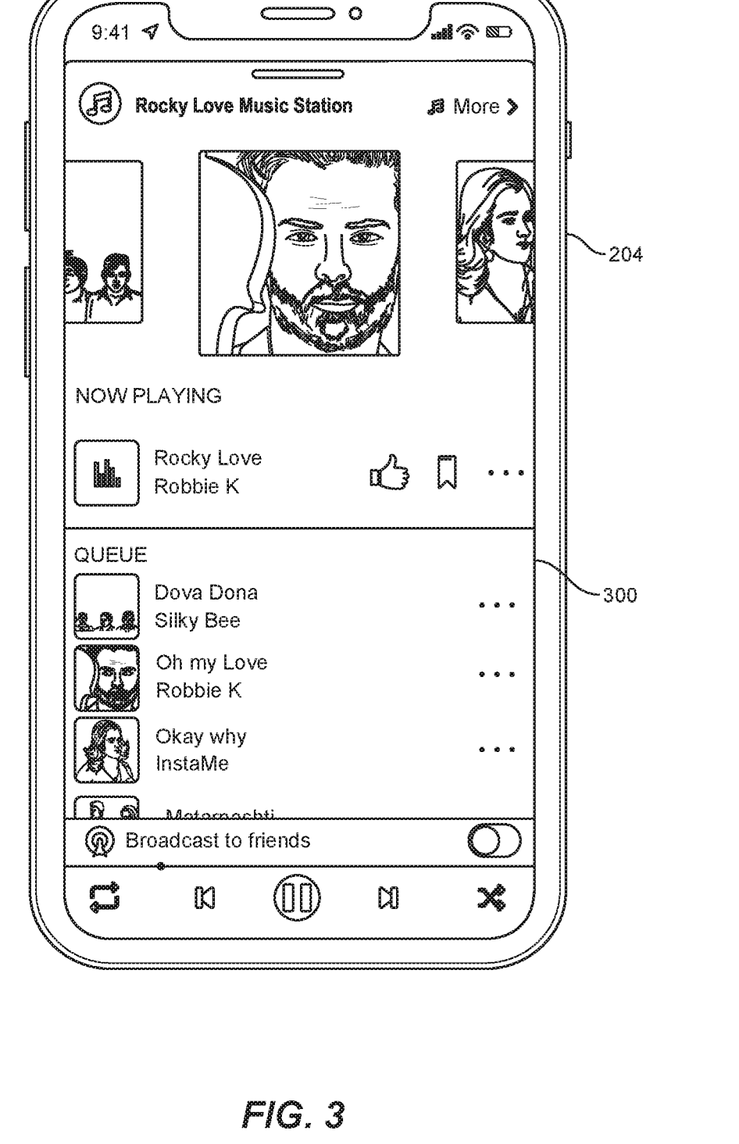
FIG. 3 is an illustration of an exemplary music player interface.

In addition, or as an alternative, to operating as a passive layer within social media platform 206, music service 212 may operate as part of an active layer within social media platform 206 (e.g., within an active-layer interface or set of active-layer interfaces dedicated to music consumption and/ or music sharing). The active-layer interface may represent any type or form of interface dedicated to music consumption and/or sharing. In some examples, the active-layer interface may represent a player interface corresponding to a music player. Player interface 300 in FIG. 3 provides one specific example of an active-layer player interface configured to play music compositions added to a music station created for user 208.

In some examples, music service 212 may provide a group-music selection system that selects and/or plays music for a group of users (e.g., enabling a shared listening experience for the group). In one embodiment, the group-music selection system may create a shared music station for the group. In some examples, the group-music selection system may select music compositions for the shared music station based on an initial music composition submitted via user input (e.g., in accordance with the systems and methods described in connection with steps 110-140 below).

Figure 4:
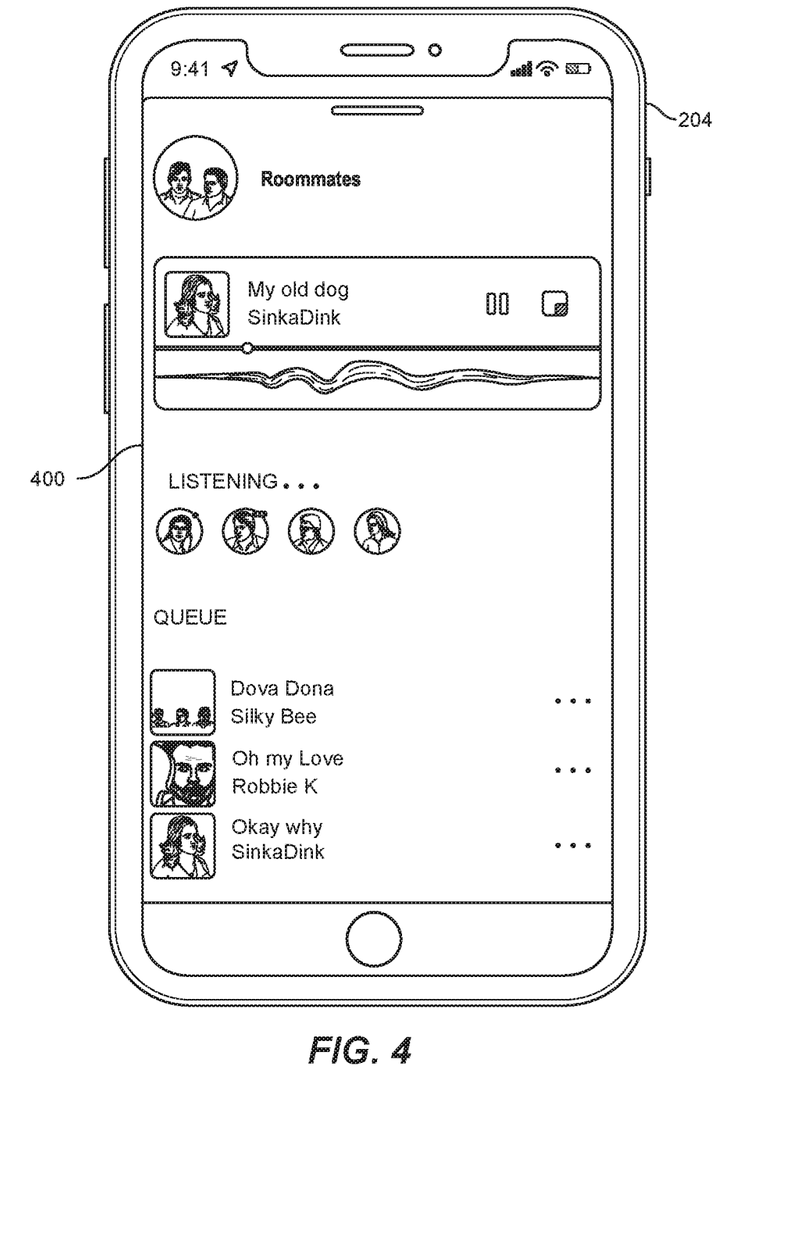
FIG. 4 is an illustration of an exemplary shared music station interface.

FIG. 4 provides an illustration of a shared music station interface 400 with a queue of music compositions selected for a group of users. In one embodiment, the group-music selection system may be accessed by each user within the group independently (e.g., each user may access the shared music station via his or her own device). In this embodiment, the group-music selection system may be configured to play music compositions for users within the group synchronously or asynchronously.

Figure 5:
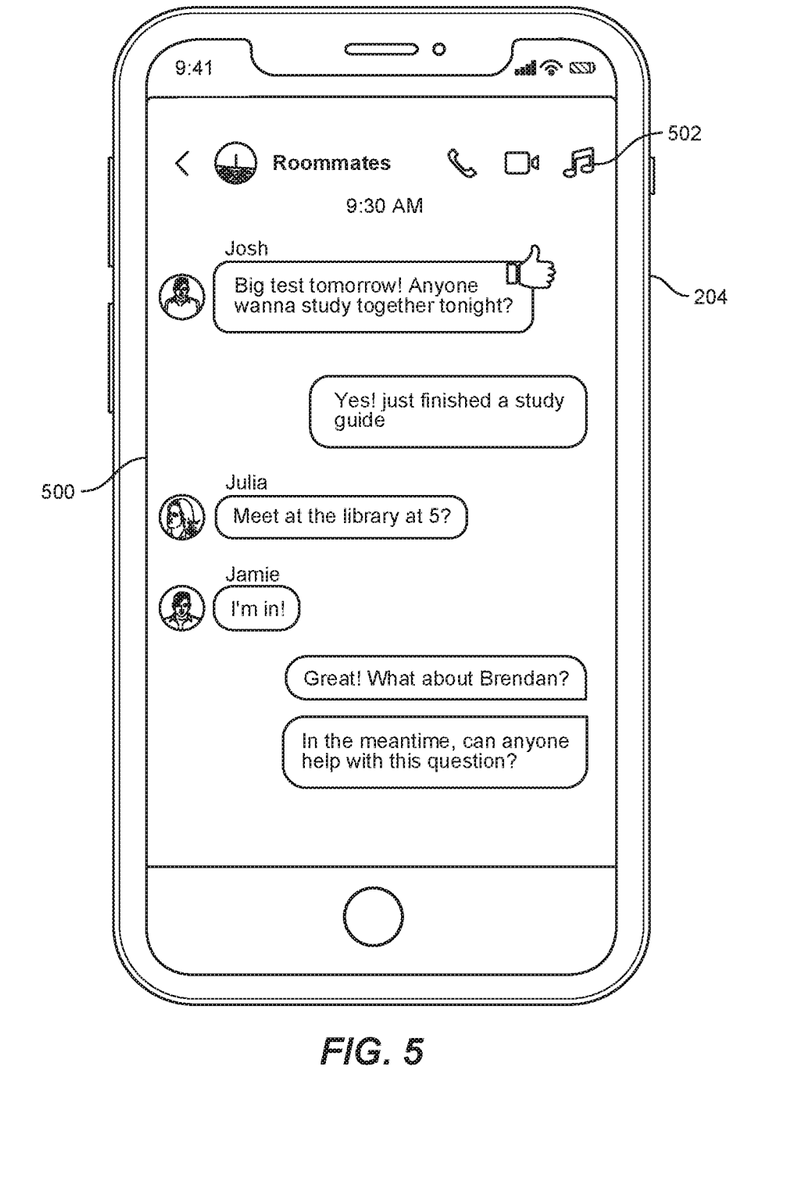
FIG. 5 is an illustration of an exemplary messaging interface that may navigate to the shared music station interface depicted in FIG. 4.

In some examples, the group-music selection system may operate as part of a stand-alone product (e.g., as part of an active layer within social media platform 206 dedicated to enabling co-listening). In other examples, the group-music selection system may operate in conjunction with another digital service (e.g., as a passive layer within another service offered by social media platform 206). For example, the group-music selection system may operate as part of a group messaging service and may be configured to enable music co-listening between members of a digital group chat. FIG. 5 provides an illustration of a messaging interface 500 with a music element 502 configured to navigate to a shared music station interface (e.g., shared music station interface 400 in FIG. 4).

In some examples, the group-music selection system may create a shared music station automatically. For example, in examples in which the group-music selection system operates as part of a group messaging service, the group-music selection system may create a shared music station automatically in response to receiving user input creating a group message (e.g., a digital group chat). Alternatively, the group-music selection system may create the shared music station in response to receiving user input directly initiating the creation of the shared music station. In some examples, the music sharing system may enable the members of the group chat to add music compositions to the shared music station. Additionally or alternatively, the music sharing system may automatically add music compositions to the shared music station (e.g., based on an initial user music input and/or an overlap in music interests between members of the group, as will be described in greater detail in connection with steps 110-140).

Returning to FIG. 1, at step 110, one or more of the systems described herein may receive user input selecting a music composition. For example, as illustrated in FIG. 2, an input module 214 may receive user input 216 selecting a music composition 218.

Input module 214 may receive user input 216 in a variety of contexts. In one example, input module 214 may operate in connection with a music-selection system (e.g., operating within music service 212) that selects music compositions for a music station. In this example, input module 214 may be configured to create a music station 219 in response to receiving user input 216 (e.g., based on user input 216). Using FIG. 3 as a specific example, input module 214 may create a "Rocky Love Music Station," in response to receiving user input selecting the song "Rocky Love," which may be dedicated to playing music that is musically and lyrically similar to the song "Rocky Love."

In some examples, the music-selection system may represent a group-music selection system dedicated to co-listening (e.g., the group-music selection system described above in connection with the initial description of music service 212). In these examples, input module 214 may create a shared music station based on user input 216.

Input module 214 may receive user input 216 in a variety of ways. In some embodiments, input module 214 may receive user input 216 via an auxiliary device, such as a keyboard and/or a digital mouse. Additionally or alternatively, input module 214 may receive user input 216 via a touchscreen.

Returning to FIG. 1, at step 120, one or more of the systems described herein may identify features of the music composition, the features including (1) a musical feature, relating to a musical quality of the music composition, and (2) a lyrical feature, relating to one or more of the music composition's lyrics. For example, as illustrated in FIG. 2, a feature module 220 may identify features 222 of music composition 218, including a musical feature 224 and a lyrical feature 226.

Feature module 220 may identify a variety of musical features relating to music composition 218 (e.g., a tempo of music composition 218, a beat of music composition 218, a type of music composition 218, and/or a key of music composition 218). Additionally, feature module 220 may identify a variety of lyrical features relating to music composition 218 (e.g., a word or set of words included within music composition 218's lyrics and/or a phrase included within music composition 218's lyrics).

In some examples, feature module 220 may additionally identify a feature of a user from whom user input 216 was received (i.e., user 208). Feature module 220 may identify a variety of user 208's features. In some examples, feature module 220 may identify a feature relating to user 208's usage history with an online service (e.g., with social media platform 206 and/or a digital music service such as music service 212).

Feature module 220 may collect a variety of usage history data maintained by the online service. In one example, feature module 220 may collect data describing user 208's consumption history within the online service (e.g., articles, posts, advertisements, and/or linked content accessed by user 208 via the online service). In examples in which feature module 220 collects user 208's usage history with social media platform 206, feature module 220 may collect, without limitation, a friend history, a viewing history (e.g., of social media posts), a commenting history (e.g., of digital responses posted to one or more social media posts), and/or a sharing history (e.g., of content shared within posts and/or messages).

In related examples, feature module 220 may collect user 208's music-usage history (e.g., obtained via music service 212 and/or social media platform 206). For example, feature module 220 may collect a history of music consumed by user 208, liked by user 208, recommended to user 208, and/or shared by user 208.

In some examples, feature module 220 may identify a demographic of user 208 (e.g., an age) and/or a pre-existing embedding that defines user 208's interests. In one embodiment, feature module 220 may identify a usage history of one or more of user 208's contacts within the online service and/or the usage history of one or more additional users identified as sharing one or more commonalities with user 208.

In examples in which input module 214 operates as part of a group-music selection system, feature module 220 may additionally identify features of one or more additional users within a group for whom music is being selected via user input 216. Feature module 220 may identify a variety of features of the one or more additional users, such as the user features discussed above.

Returning to FIG. 1, at step 130, one or more of the systems described herein may determine that an additional music composition is similar to the music composition based on a comparison of the features of the music composition with features of the additional music composition. For example, as illustrated in FIG. 2, a comparison module 228 may determine that an additional music composition 230 is similar to music composition 218 based on a comparison of features 222 with features 232 of additional music composition 230.

Comparison module 228 may determine that additional music composition 230 is similar to music composition 218 in a variety of ways. For example, comparison module 228 may identify one or more similarities between features 222 and features 232 (e.g., a similar beat, a similar tempo, one or more similar words, a similar lyrical theme, etc.) and determine that additional music composition 230 is similar to music composition 218 in response.

In one embodiment, comparison module 228 may calculate a similarity score for additional music composition 230. The similarity score may be calculated in a variety of ways (e.g., using a variety of different algorithms). In some examples, different similarities may be given different weights, such that some similarities may affect the similarity score more than others. In embodiments in which comparison module 228 calculates a similarity score for additional music composition 230, comparison module 228 may determine that additional music composition 230 is similar to music composition 218 in response to determining that the similarity score surpasses a threshold score.

In some embodiments, features 232 may include both (1) one or more musical features of additional music composition 230 and (2) one or more lyrical features of additional music composition 230. In one such embodiment, comparison module 228 may determine that both (1) the musical features of additional music composition 230 are similar to the musical features of music composition 218 and (2) the lyrical features of additional music composition 230 are similar to the lyrical features of music composition 218 (e.g., in response to a policy to identify an additional music composition that matches both the musical and lyrical features of music composition 218).

In one example, comparison module 228 may rely on a neural network configured to identify a closeness of music composition 218 to additional music composition 230 based on one or more identified similarities between features 222 and features 232. Comparison module 228 may rely on a variety of types of neural networks (e.g., a multi-tower model and/or a graph convolution model). Additionally or alternatively, comparison module 228 may rely on a static policy to identify a closeness of features 222 to features 232. The static policy may include one or more instructions for identifying a similarity between features (e.g., an instruction that tempos that fall within a designated range are similar). The static policy may include a similarity threshold that must be reached to determine that two music compositions are similar.

In examples in which feature module 220 identified one or more features of user 208, comparison module 228 may further determine that additional music composition 230 is likely to be enjoyed by user 208 based on user 208's identified features. Comparison module 228 may determine that additional music composition 230 is likely to be enjoyed by user 208 in a variety of ways. In some examples, comparison module 228 may rely on a neural network. Comparison module 228 may rely on a variety of types of neural networks. As a specific example, comparison module 228 may determine that additional music composition 230 is likely to be enjoyed by user 208 using a two-tower model that compares the closeness of a user embedding, dedicated to user 208's features, and an audio-track embedding, dedicated to features 222.

In addition to determining that additional music composition 230 is likely to be enjoyed by user 208 based on user 208's identified features, in examples in which input module 214 received user input 216 via a group-music selection system, comparison module 228 may further determine that additional music composition 230 is likely to be enjoyed by one or more additional users within a group of users associated with user input 216 (e.g., based on an analysis performed by a neural network). In some examples, comparison module 228 may determine that each user within the group of users is likely to enjoy additional music composition 230. Additionally or alternatively, comparison module 228 may determine that more than a threshold number and/or percentage of the users within the group of users is likely to enjoy additional music composition 230.

Returning to FIG. 1, at step 140, one or more of the systems described herein may select the additional music composition to be added to a queue associated with the music composition based on the determination. For example, as illustrated in FIG. 2, a selection module 234 may select additional music composition 230 to be added to a queue 236 associated with music composition 218 based on the determination made by comparison module 228. In examples in which comparison module 228 made one or more additional determinations (e.g. that user 208 and/or a group of users is likely to enjoy additional music composition 230), selection module 234 may select additional music composition 230 based additionally on the one or more additional determinations.

Selection module 234 may add additional music composition 230 to queue 236 in a variety of contexts. In some examples, selection module 234 may add additional music composition 230 to a queue (i.e., queue 236) corresponding to a music station (i.e., music station 219) created based on user input 216. Returning to FIG. 3 as a specific example, user input 216 may add the song "Dova Dona" to a "Rocky Love Music Station" (created based on user input selecting "Rocky Love" as an initial music composition) based on a determination that the musical and lyrical features of "Dova Dona" match the musical and lyrical features of "Rocky Love." In examples in which input module 214 received user input 216 within a group-music selection system, input module 214 may add additional music composition 230 to a group music station created via user input 216.

In embodiments in which the disclosed systems and methods enable users (e.g., of music service 212) to upload music compositions to be shared with others, the disclosed systems and methods may be used to compare the features (e.g. the musical features and lyrical features) of the uploaded music compositions (e.g., using the systems and methods described in connection with step 120 and step 130). In some examples, comparison module 228 may determine that a similarity metric of two uploaded music compositions surpasses a similarity threshold and may determine, based on the similarity metric surpassing the similarity threshold, that the two uploaded music compositions are duplicates. In response, selection module 234 may eliminate one of the two uploaded music compositions within a database that stores uploaded music compositions.

As described throughout the present disclosure, the disclosed systems and methods provide systems and methods for feature-based music selection. In one example, a computer-implemented method may include (1) receiving user input selecting a music composition, (2) identifying features of the music composition including (i) a musical feature, relating to a musical quality of the music composition (e.g., a tempo, beat, type, and/or key of the music composition) and (ii) a lyrical feature, relating to one or more of the music composition's lyrics (e.g., a word, set of words, and/or phrase included within the music composition's lyrics), (3) determine that an additional music composition is similar to the music composition based on a comparison of the features of the music composition with features of the additional music composition (e.g., using a neural network), and (4) selecting the additional music composition to be added to a queue associated with the music composition based on the determination.

In some examples, the method may further include (1) identifying a feature of a user from whom the user input was received, (2) determining that the additional music composition is likely to be enjoyed by the user based on the feature of the user, and (3) selecting the additional music composition to be added to the queue based additionally on the determination that the additional music composition is likely to be enjoyed by the user.

The feature of the user may include, without limitation, the user's usage history with an online service, the usage history of one or more of the user's contacts within the online service, a demographic of the user, and/or a pre-existing embedding that defines the user's interests. In some examples, the online service may represent a social media platform. In these examples, the usage history may include, without limitation, a viewing history, a commenting history, and/or a sharing history.

In one embodiment, the method may further include creating a music station that includes the queue in response to receiving the user input. In certain embodiments, receiving the user input may include (1) providing a group-music selection system that plays music compositions that have been selected for a particular group of users based on an initial music composition submitted via user input to the group-music selection system and (2) receiving the user input via the group-music selection system.

In one example, a corresponding system for implementing the above-described method may include (1) an input module, stored in memory, that receives user input selecting a music composition, (2) a feature module, stored in memory, that identifies features of the music composition including (i) a musical feature, relating to a musical quality of the music composition and (ii) a lyrical feature, relating to one or more of the music composition's lyrics, (3) a comparison module, stored in memory, that determines that an additional music composition is similar to the music composition based on a comparison of the features of the music composition with features of the additional music composition, (4) a selection module, stored in memory, that selects the additional music composition to be added to a queue associated with the music composition based on the determination, and (5) at least one physical processor configured to execute the input module, the feature module, the comparison module, and the selection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) receive user input selecting a music composition, (2) identify features of the music composition including (i) a musical feature, relating to a musical quality of the music composition and (ii) a lyrical feature, relating to one or more of the music composition's lyrics, (3) determine that an additional music composition is similar to the music composition based on a comparison of the features of the music composition with features of the additional music composition, and (4) select the additional music composition to be added to a queue associated with the music composition based on the determination.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   creating a shared music station for members of a digital group message, wherein a group-music selection system is configured to add music to the shared music station based on an initial user-selected music composition;
   receiving user input selecting the initial user-selected music composition;
   identifying (1) one or more features of the initial user-selected music composition and (2) an overlap in music interests between the members of the digital group message;
   using a neural network to select an additional music composition to be added to the shared music station in response to the neural network:
      determining that the additional music composition is similar to the initial user-selected music composition based on a comparison of the features of the initial user-selected music composition with features of the additional music composition; and
      determining that the additional music composition falls within the overlap in music interests; and
   adding the additional music composition to the shared music station.

2. The computer-implemented method of claim 1, wherein the one or more features of the initial user-selected music composition comprise a lyrical feature.

3. The computer-implemented method of claim 2, wherein the lyrical feature comprises at least one of:
   a word or set of words included within the initial user-selected music composition's lyrics; or
   a phrase included within the initial user-selected music composition's lyrics.

4. The computer-implemented method of claim 1, further comprising:
   identifying a feature of a member of the digital group message;
   determining that the additional music composition is likely to be enjoyed by the member based on the feature of the member; and
   selecting the additional music composition based additionally on the determination that the additional music composition is likely to be enjoyed by the member.

5. The computer-implemented method of claim 4, wherein the feature of the member comprises at least one of:
   the member's usage history with an online service;
   a usage history of one or more of the member's contacts within the online service;
   a demographic of the member; or
   a pre-existing embedding that defines the member's interests.

6. The computer-implemented method of claim 5, wherein:
   the online service comprises a social media platform; and
   the usage history comprises at least one of:
      a viewing history;
      a commenting history; or
      a sharing history.

7. The computer-implemented method of claim 1, wherein the one or more features of the initial user-selected music composition comprise a lyrical feature.

8. The computer-implemented method of claim 7, wherein the musical feature comprises at least one of:
   a tempo of the initial user-selected music composition;
   a beat of the initial user-selected music composition;
   a type of the initial user-selected music composition; or
   a key of the initial user-selected music composition.

9. The computer-implemented method of claim 1, further comprising:
   providing each member of the digital group message with access to a shared music station interface, accessible to each member via the member's user device; and
   enabling synchronous music consumption for the members of the digital group message via the shared music station interface.

10. A system comprising:
    a music service module, stored in memory, that creates a shared music station for members of a digital group message, wherein a group-music selection system is configured to add music to the shared music station based on an initial user-selected music composition;
    an input module, stored in memory, that receives user input selecting the initial user-selected music composition;

a feature module, stored in memory, that identifies (1) one or more features of the initial user-selected music composition and (2) an overlap in music interests between the members of the digital group message; and a selection module, stored in memory, that:
uses a neural network to select an additional music composition to be added to the shared music station in response to the neural network (1) determining that the additional music composition is similar to the initial user-selected music composition based on a comparison of the features of the initial user-selected music composition with features of the additional music composition and (2) determining that the additional music composition falls within the overlap in music interests; and
adds the additional music composition to the shared music station; and at least one physical processor configured to execute the music service module, the input module, the feature module, and the selection module.

11. The system of claim 10, wherein one or more features of the initial user-selected music composition comprise a lyrical feature.

12. The system of claim 11, wherein the lyrical feature comprises at least one of:
a word or set of words included within the initial user-selected music composition's lyrics; or
a phrase included within the initial user-selected music composition's lyrics.

13. The system of claim 10, wherein:
the feature module further identifies a feature of a member of the digital group message;
the comparison module further determines that the additional music composition is likely to be enjoyed by the member based on the feature of the member; and
the selection module selects the additional music composition based additionally on the determination that the additional music composition is likely to be enjoyed by the member.

14. The system of claim 10, wherein the comparison module uses a neural network to determine that the additional music composition is similar to the initial user-selected music composition.

15. The system of claim 10, wherein the input module receives the user input via the group-music selection system.

16. A non-transitory computer-readable medium comprising one or more computer-readable instructions that, when executed by at least one processor of a computing device, cause the computing device to:
create a shared music station for members of a digital group message, wherein a group-music selection system is configured to add music to the shared music station based on an initial user-selected music composition;
receive user input selecting the initial user-selected music composition;
identify (1) one or more features of the initial user-selected music composition and (2) an overlap in music interests between the members of the digital group message; and
use a neural network to select an additional music composition to be added to the shared music station in response to the neural network:
determining that the additional music composition is similar to the initial user-selected music composition based on a comparison of the features of the initial user-selected music composition with features of the additional music composition; and
determining that the additional music composition falls within the overlap in music interests; and
add the additional music composition to the shared music station.

17. The non-transitory computer-readable medium of claim 16, wherein the one or more features of the initial user-selected music composition comprise a lyrical feature.

18. The non-transitory computer-readable medium of claim 17, wherein the lyrical feature comprises at least one of:
a word or set of words included within the initial user-selected music composition's lyrics; or
a phrase included within the initial user-selected music composition's lyrics.

19. The computer-implemented method of claim 1, wherein creating the shared music station comprises creating the shared music station automatically in response to receiving user input initiating the digital group message.

20. The computer-implemented method of claim 9, further comprising providing a music element, within a messaging interface corresponding to the digital group message, that is configured to navigate to the shared music station interface when selected via user input.

* * * * *